United States Patent
Ormachea et al.

(10) Patent No.: US 7,040,196 B2
(45) Date of Patent: May 9, 2006

(54) ASSEMBLY MACHINE WITH SPATIAL POSITIONING CONTROL

(75) Inventors: Raymond Ormachea, Fraser, MI (US); Robert Bailey, Waterford, MI (US)

(73) Assignee: Automated Solutions, Shelby Township, MI (US)

(*) Notice: Subject to any disclaimer, the term of this patent is extended or adjusted under 35 U.S.C. 154(b) by 0 days.

(21) Appl. No.: 10/762,707

(22) Filed: Jan. 22, 2004

(65) Prior Publication Data

US 2004/0163497 A1   Aug. 26, 2004

Related U.S. Application Data

(60) Provisional application No. 60/442,206, filed on Jan. 24, 2003.

(51) Int. Cl.
  *B25B 17/00*   (2006.01)
  *B25B 29/00*   (2006.01)
(52) U.S. Cl. .......................... 81/57.4; 81/52
(58) Field of Classification Search .............. 81/52, 81/57.24, 57.35, 57.4, 429
  See application file for complete search history.

(56) References Cited

U.S. PATENT DOCUMENTS

| | | | |
|---|---|---|---|
| 3,124,976 A * | 3/1964 | Pittwood | 81/57.4 |
| 4,562,756 A * | 1/1986 | Otsuki et al. | 81/57.4 |
| 4,777,851 A * | 10/1988 | Gubitose | 81/57.4 |
| 5,125,298 A * | 6/1992 | Smith | 81/57.35 |
| 5,544,554 A * | 8/1996 | Brightly | 81/57.4 |
| 6,711,972 B1 * | 3/2004 | Joyner et al. | 81/57.4 |
| 6,736,033 B1 * | 5/2004 | Castanon | 81/57.4 |
| 2002/0032956 A1 | 3/2002 | Walt, II et al. | |
| 2004/0163497 A1 * | 8/2004 | Ormachea et al. | 81/57.4 |

* cited by examiner

*Primary Examiner*—Lee D. Wilson
(74) *Attorney, Agent, or Firm*—Carlson, Gaskey & Olds

(57) ABSTRACT

An assembly machine includes a support structure having a plurality of selectively moveable support members that facilitate manually manipulating a tool relative to a work piece. A controller continuously gathers position information regarding the support members to determine every position of the tool. The controller includes a teach mode that allows for storing selected tool activation positions in particular sequences for subsequent control of the tool according to necessary procedures for completing a variety of assembly processes. One example machine designed according to this invention includes selectively controlled biasing members that maintain a zero balance on the tool, provide an operator assist to moving the tool or both.

16 Claims, 2 Drawing Sheets

ASSEMBLY MACHINE WITH SPATIAL POSITIONING CONTROL

CROSS REFERENCE TO RELATED APPLICATIONS

This application claims priority to U.S. Provisional Application No. 60/442,206 which was filed on Jan. 24, 2003.

BACKGROUND OF THE INVENTION

This invention generally relates to spatial position control for assembly machinery such as torque arms.

A variety of machines are available to assist operators at assembling components such as the portions of a vehicle seat. Traditional assemblies include support mechanisms that allow an operator to position a tool in a desired position relative to the work piece to carry out the necessary steps of at least a portion of an assembly process. In many instances, electronic controllers are provided to control the air supply to a tool mounted on the machinery, for example. Conventional controllers also verify that the appropriate torque is applied by a tool (such as a rotary wrench) to secure fasteners in place, for example.

In some instances, machines have been designed for particular applications. When the desired locations of the tool for completing an operation on a specific work part are known, some machines are provided with limit switches or encoders physically located on the machinery in a position corresponding to the desired positions of the tool, based upon the known work piece configuration. Such limit switches provide only limited information regarding the location of the tool to the controller during an assembly process. For example, multiple support members may be moveable into a variety of positions relative to each other to achieve a desired tool position. Conventional switch placement typically only indicates the relative positions of two such support members and not the remainder of the machine.

A major shortcoming of such arrangements is that the machinery is limited to a specific operation and cannot provide tool position information with any range of versatility. Further, an increase in the number of tool locations that are necessary during an assembly process, increases the number of switches positioned on the machinery. Further, such switches only provide position information at their particular location and, therefore, provide limited information to the controller regarding the position of the tool.

Another shortcoming of conventional arrangements is that the typical controller is large, bulky and expensive. Multiple control panels typically are required to make all necessary connections. Further, the user interfaces provided for the operators traditionally have been limited and often not user-friendly.

There is a need for an improved assembly machine that allows an operator to manually manipulate a tool into a variety of positions to complete a variety of assembly processes. This invention meets that need while avoiding the shortcomings and drawbacks of the prior art.

SUMMARY OF THE INVENTION

In general terms, this invention is a machine that supports a tool for use during an assembly process that includes a controller that utilizes continuous position information regarding the tool to control the operation of the tool.

One example machine designed according to this invention includes a base and a plurality of support members that are moveable relative to the base. At least one of the support members is adapted to support the tool. The support members cooperate to allow an operator to move the tool relative to the base along at least two axes. A plurality of position indicators are associated with at least some of the support members. The position indicators provide position information regarding every position of the tool relative to the base. A controller communicates with the position indicators and determines every position of the tool. The controller utilizes the tool position information to selectively control operation of the tool.

In one example, the controller includes a teach mode that allows an operator to manipulate the tool (and the support members) into the desired tool activation positions corresponding to an assembly operation. The controller stores position information for each of the tool activation positions and then subsequently controls use of the tool such that the tool will be activated only in the appropriate positions.

In one example, the operator readily communicates with the controller using a touch screen display panel.

One controller designed according to this invention includes the ability to store a desired order of tool activation positions and then to control subsequent use of the tool such that an operator must follow the desired order during an assembly process.

Another example machine designed according to this invention includes a plurality of biasing members associated with at least some of the support members. The biasing members have a selectable biasing force that is applied to the corresponding support members. The controller controls the biasing force applied by the biasing members to maintain a zero balance condition of the tool in all tool positions.

In one example, the controller includes a stored home position for the tool and the controller selectively controls the biasing members to return the tool to a home position at the end of an assembly operation.

In another example, the controller uses continuous position information regarding the tool and determines a direction of movement of the tool. The controller selectively controls the bias of the biasing members to cooperate with an operator's desired movement of the tool in a manner that reduces operator fatigue, for example.

An assembly machine designed according to this invention includes several advantages compared to prior machines. The various features and advantages of this invention will become apparent to those skilled in the art from the following detailed description. The drawings that accompany the detailed description can be briefly described as follows.

DETAILED DESCRIPTION OF THE PREFERRED EMBODIMENTS

Figure 1:
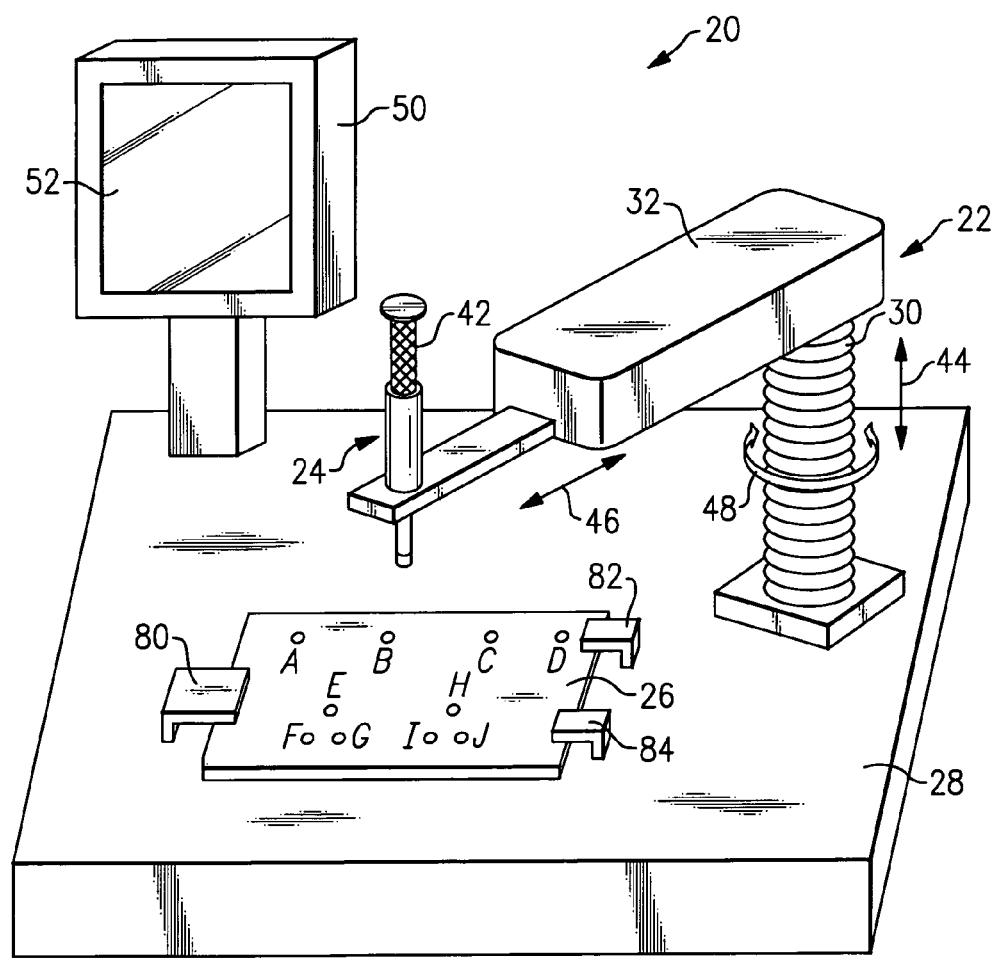
FIG. 1 schematically illustrates an assembly machine designed according to this invention in perspective.
Figure 2:
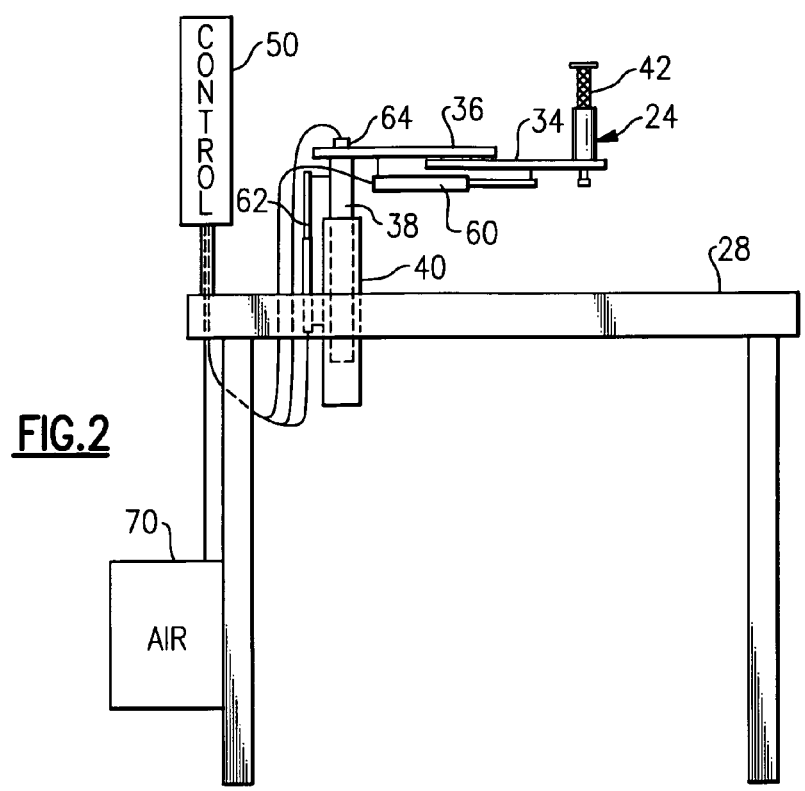
FIG. 2 is a side elevational view showing selected components of a machine designed according to this invention.

FIGS. 1 and 2 schematically show an example assembly machine 20 having a support structure 22 for supporting a tool 24. In the illustrated example, the tool 24 comprises a rotary wrench and the tool support structure 22 is a torque arm. This invention is not limited to such an arrangement, however.

The tool support structure 22 allows an operator to manually manipulate the tool 24 relative to a work piece 26, which is appropriately positioned on a base surface 28.

The tool support structure 22 includes a bellows-like covering 30 over selected portions of the assembly and a sleeve covering 32 over other portions. The coverings 30 and 32 allow for maintaining electrical and pneumatic connections within the covers, which enhances the appearance of the assembly and minimizes the likelihood for an operator to accidentally damage the wires or hoses used to make the appropriate connection.

As best appreciated from FIG. 2 (where the coves 30 and 32 are removed), the support assembly 22 includes a plurality of support members 34, 36, 38 and 40. The support member 34 is slidable relative to the support member 36. The support member 36 is rotatably supported for rotary movement relative to the support member 38. The support member 38 is slidable relative to the support member 40. In this example, the support members 38 and 40 comprise a telescoping arrangement.

The arrangement of the support members preferably allows an operator to grab a handle 42 of the tool 24 and to manually move the tool in a selected direction along at least two axes. The illustrated example provides three degrees of freedom of movement (i.e., movement along three axes). The tool may be moved along a first, vertical axis as schematically shown by the arrow 44 in FIG. 1. The tool may be moved horizontally along an axis shown by the arrow 46. Further, the tool may be rotated about the vertical axis 44 as shown by the arrows 48. Accordingly, the tool 24 in the example of FIG. 1 is moveable along three axes or has three degrees of freedom of movement. In another example, the tool is further manipulatable (i.e., tilted) about another axis so that it may be moved into an angular position relative to the vertical position shown in the illustrated example.

A controller 50 preferably includes a touch screen 52. The controller 50 controls operation of the tool 24 so that an operator achieves the desired assembly steps to complete the necessary work on the work piece 26. The controller 50 in this example preferably is PC based and provides all of the input and output connections necessary to communicate with and provide power to the various components of the machine 20. A significant advantage of such a controller is that it greatly reduces the size and cost compared to previous controller arrangements.

The touch screen 52 provides a user-friendly, customizable display presenting the operator with easy-to-understand information. The touch screen 52 provides a customizable interface that allows the operator to communicate with the controller 50.

The controller 50 in one example preferably is programmed to continuously determine the location of the tool 24 relative to the base 28 (or a selected reference point). As best appreciated from FIG. 2, the illustrated example includes position indicators that provide information to the controller 50 regarding the relative positions of the support members 34, 36, 38 and 40, which allows the controller 50 to determine a current position of the tool 24. In this example, a linear transducer 60 provides signals to the controller 50 in a conventional manner regarding the relative positions of support members 34 and 36. Another linear transducer 62 provides relative position information regarding the support members 38 and 40. A potentiometer 64 provides information in a conventional manner regarding the rotary position of the support member 36 relative to the support member 38.

Each of the position indicators 60, 62 and 64 preferably continuously provide position information to the controller 50. Such position indicators provide position information regarding the tool 24 at all locations of the tool relative to the base 28 (i.e., all orientations of the support members). This represents a significant advancement over the art where limited position information was only available at specific locations where limit switches or similar devices were physically mounted on the support structure of the machine. The ability to determine the position of the tool 24 at all times provides for enhanced machine control and operation and greatly increases the versatility of applications for which the machine can be used.

In one example, the tool 24 is air powered by a source of compressed air 70. The controller 50 preferably controls the supply of power to the tool 24 so that the tool is only activated at appropriate locations relative to the work piece 26. In the example of FIG. 1, the work piece includes a plurality of locations where fasteners need to be applied by an operator using the tool 24. The controller 50 is programmed in one example to only allow the air supply to the tool 24 to activate the tool when the tool is in a position corresponding to the installation position of a fastener at one of the points A–J indicated on the example work piece 26.

The controller in one example, preferably monitors the torque level applied by the tool, using conventional techniques. The controller in this example provides a visual indication on the display 52 when there is a malfunction, for example. In some cases, the controller will not permit subsequent tool activation until the operator follows a reset procedure to address the detected malfunction.

In one example, the controller is programmed to include a teach mode that allows an operator to manually manipulate the tool 24 into a plurality of positions where the tool must be activated to complete an assembly operation. By choosing an appropriate option on the touch screen 52, the operator indicates to the controller 50 that the teach mode should begin. Then the operator manually manipulates the tool 24 into the tool activation positions needed for the particular assembly operation. This can be done using a sample work piece and moving the tool into the appropriate positions near the work piece corresponding to fastener locations, for example. By utilizing an option on the touch screen 52, the operator communicates to the controller 50 when the tool 24 is in a desired tool activation position. The controller 50 preferably is programmed to store such position information to later control activation of the tool 24 during the necessary assembly process.

In one example, the controller 50 is capable of storing a plurality of tool activation positions and sequences so that a desired assembly process is carried out accurately and in a particular sequence. For example, during the teach mode the operator moves the tool 24 into the tool activation positions in a particular order. In the example of FIG. 1, assume that fasteners must be applied at point A followed by point B followed by point C and then point D. Further assume that the points E and H must be fastened before the points F, G, I and J. The particular order of fastening preferably is stored in the controller 50 so that the controller later controls activation of the tool 24 so that power is provided to the tool only when the appropriate positions are achieved in the necessary order.

In FIG. 1, clamps 80, 82 and 84 are schematically shown that are pneumatically activated for holding the work piece 26 in place. The controller 50 in one example determines whether the clamps have been appropriately activated so that the work piece 26 is in place prior to allowing the tool 24 to be used in a prestored sequence, for example. Clamp activation or release is accomplished in an example by choosing an appropriate option on the touch screen 52.

In one example, the controller 50 is capable of storing position and sequence information regarding a plurality of operations for various work pieces. By making an appropriate selection on the touch screen 52 an operator can indicate which work piece or assembly process is required and then the controller 50 responsively controls activation of the tool 24 to facilitate completing the necessary operation.

Figure 3:
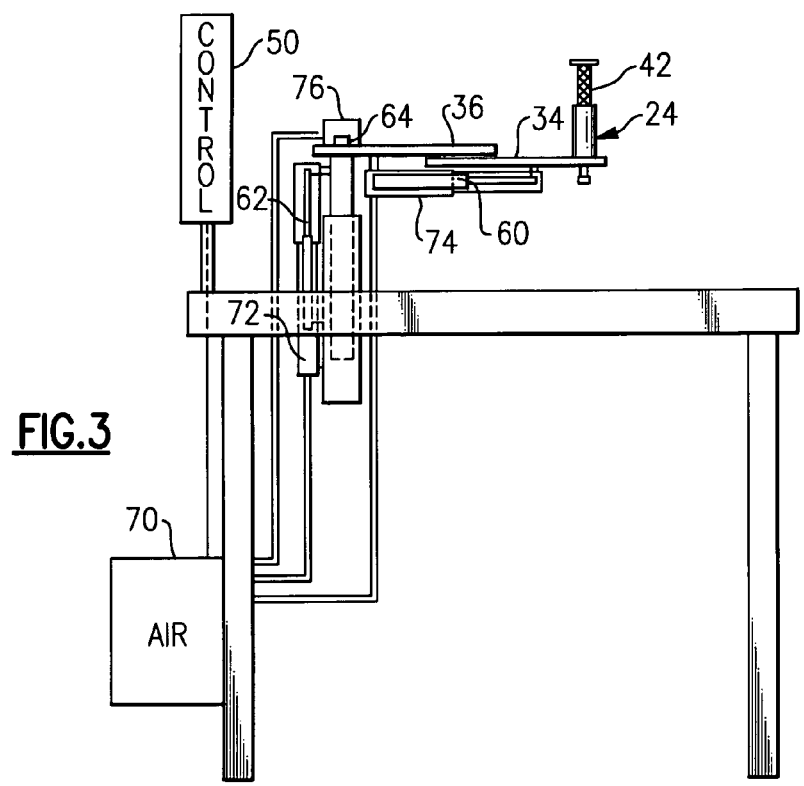
FIG. 3 is a side elevational view showing selected features of another example machine designed according to this invention.

Another feature of an example tool designed according to this invention is shown in FIG. 3. In this example, biasing members 72, 74 and 76 are associated with the support members of the support structure 22. The biasing member 72, for example, controls relative movement between the support members 38 and 40. The biasing member 74 similarly controls relative movement between the support members 34 and 36. In one example, the biasing members 72 and 74 are linear, pneumatic actuators that impose a force in a selected direction depending on a level of pressure supplied to the actuator. In this example, the controller 50 controls the supply from the air supply 70 to the biasing members 72 and 74 to achieve a desired movement or non-movement of the corresponding support members.

In this example, the biasing member 76 comprises a pneumatically activated rotary actuator. Controlling the air pressure to the biasing member 76 controls the rotary position of the support member 36 relative to the support member 38.

In one example, the controller 50 is programmed to maintain the tool 24 in a home position after an assembly process has been completed. By selectively adjusting the air supply to the biasing members, by controlling supply valves (not illustrated) for example, the controller 50 causes an automatic manipulation or movement of the tool 24 into a home position.

In one example, the controller 50 is programmed to continuously maintain a "zero balance" condition for the tool 24. By selectively controlling the pressure to the various biasing members, the controller 50 can maintain the tool in any position selected by an operator. For example, if an operator moves a tool upward and forward, the controller 50 increases the pressure on the biasing member 72 to maintain the tool at the higher position. In some instances, no adjustment will be necessary to the biasing member 74 if the tool is pulled forward (i.e., the support member 34 is moved relative to the support member 36). Maintaining a zero balance condition on the tool enhances the "feel" of the tool and tends to resist operator fatigue.

In another example, the controller 50 continuously monitors the position of the tool 24. As the controller 50 receives signals from the position indicators indicating a particular movement of the tool 24, the controller 50 adjusts the bias of appropriate biasing members to urge the tool in the direction of selected movement. In this example, the controller 50 and the biasing members cooperate to provide an assist to the operator for moving the tool in a desired direction. Such an arrangement further reduces the possibility for operator fatigue over many cycles of assembly processes.

In one example, the position indicators and the biasing members are integrated into single components. For example, the linear transducer 60 and the biasing members 74 are incorporated into a single device, which is pneumatically activated and provides position information signals when the components of the pneumatic device move relative to each other such that the controller 50 determines that there is relative movement between the support members 34 and 36.

The inventive machine represents improvements over the art including utilizing continuous position information so that every position of the tool 24 may be discerned to provide a variety of control features as discussed above. Further, some example machines designed according to this invention reduce operator fatigue and provide enhanced control features that improve the "feel" of the tool during operation.

The preceding description is exemplary rather than limiting in nature. Variations and modifications to the disclosed examples may become apparent to those skilled in the art that do not necessarily depart from the scope of this invention. The scope of legal protection given to this invention can only be determined by studying the following claims.

We claim:

1. A machine for supporting a tool, comprising:
   a base;
   a plurality of support members that are moveable relative to the base, at least one of the support members being adapted to support the tool, the support members cooperating to provide movement of the tool relative to the base along at least two axes;
   a plurality of position indicators associated with at least some of the support members, the position indicators providing position information regarding every position of the tool; and
   a controller that communicates with the position indicators and determines every position of the tool relative to a selected reference position.

2. The machine of claim 1, wherein the position indicators include at least one linear transducer.

3. The machine of claim 1, wherein the position indicators includes at least one potentiometer.

4. The machine of claim 1, wherein the support members are manually moveable into a plurality of desired tool activation positions and wherein the controller includes a teach mode that allows an operator to manipulate the support members into the desired tool activation positions and the controller stores position information for each of the tool activation positions and the controller controls subsequent use of the tool such that the tool is activated only in the stored activation positions.

5. The machine of claim 4, wherein the controller stores a desired order of activation positions and controls subsequent use of the tool such that the tool is activated only when the tool is moved in the desired order among the activation positions.

6. The machine of claim 1, including a plurality of biasing members that have a selectable biasing force, the biasing members applying a biasing force to at least some of the support members to bias the tool into a selected position.

7. The machine of claim 6, wherein the controller controls the biasing force applied by the biasing members responsive to a determined direction of movement of at least one of the support members to maintain a zero balance condition at all positions of the tool.

8. The machine of claim 6, wherein the controller selectively controls the biasing force applied by at least one of the biasing members responsive to a determined direction of movement of at least one of the support members to decrease the biasing force in a direction that is opposite from the direction of movement.

9. The machine of claim 6, wherein the biasing members each comprise a pneumatic actuator.

10. A machine for supporting a tool, comprising:
a base;
a plurality of support members that are moveable relative to the base, at least one of the support members being adapted to support the tool, the support members cooperating to provide movement of the tool relative to the base along at least two axes;
a plurality of biasing members that have a selectable biasing force, the biasing members applying a biasing force to at least some of the support members; and
a controller that controls the biasing force applied by the biasing members to maintain a desired bias on the support members at a plurality of positions of the tool.

11. The machine of claim 10, wherein the controller controls the biasing force applied by the biasing members responsive to a determined direction of movement of at least one of the support members to decrease the biasing force opposing the direction of movement.

12. The machine of claim 10, wherein the controller controls the biasing members to continuously maintain a zero balance condition for the tool.

13. The machine of claim 10, including a plurality of position indicators associated with at least some of the support members, the position indicators providing position information regarding every position of the tool.

14. The machine or claim 13, wherein the position indicators include at least one of a linear transducer or a potentiometer.

15. The machine of claim 13, wherein the support members are manually moveable into a plurality of desired tool activation positions and wherein the controller includes a teach mode that allows an operator to manipulate the support members into the desired tool activation positions and the controller stores position information for each of the tool activation positions and the controller controls subsequent use of the tool such that the tool is activated only in the stored activation positions.

16. The machine of claim 15, wherein the controller stores a desired order of activation positions and controls subsequent use of the tool such that the tool is activated only when the tool is moved in the desired order among the activation positions.

* * * * *